(No Model.)
A. L. RUFF.
BICYCLE LOCK.
No. 568,372. Patented Sept. 29, 1896.
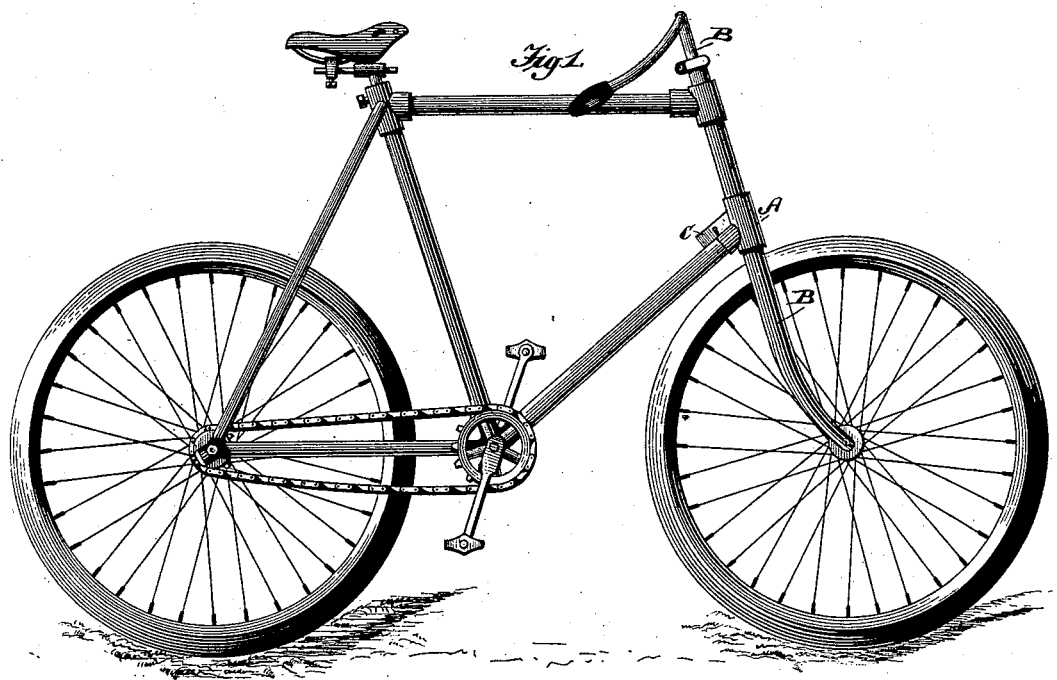
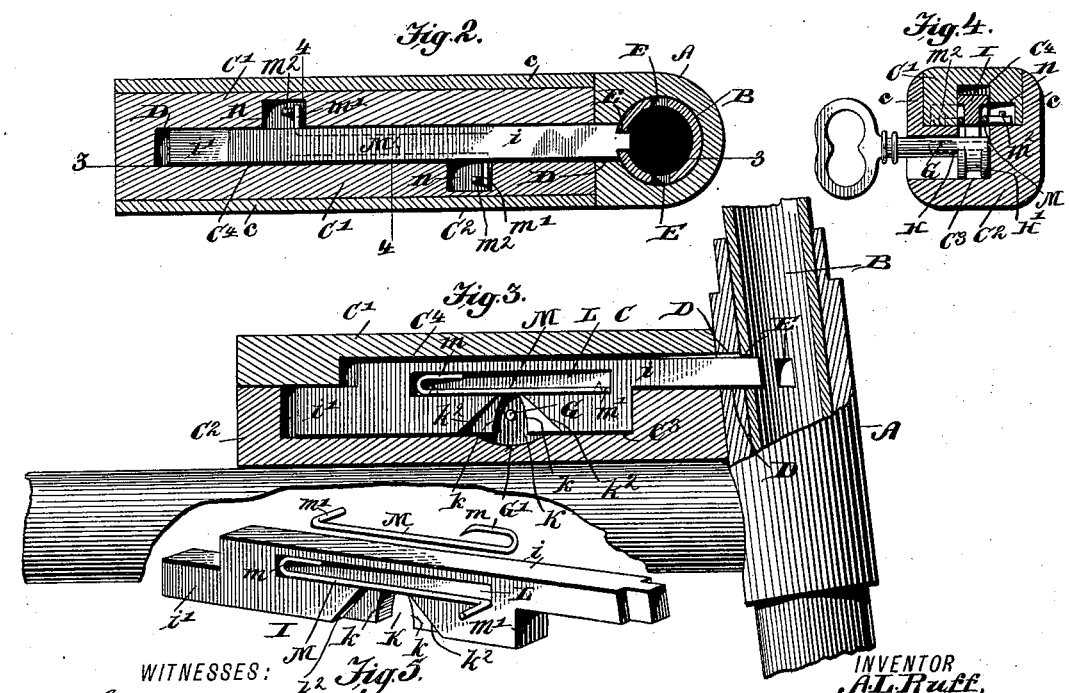
WITNESSES:
H. G. Dieterich
Chas. E. Brock
INVENTOR
A. L. Ruff,
BY O'Meara & Co.
ATTORNEYS

UNITED STATES PATENT OFFICE.

ABRAHAM L. RUFF, OF DICKERSON RUN, PENNSYLVANIA.

BICYCLE-LOCK.

SPECIFICATION forming part of Letters Patent No. 568,372, dated September 29, 1896.

Application filed March 20, 1896. Serial No. 584,160. (No model.)

*To all whom it may concern:*

Be it known that I, ABRAHAM L. RUFF, residing at Dickerson Run, in the county of Fayette and State of Pennsylvania, have invented a new and Improved Bicycle-Lock, of which the following is a specification.

This invention relates generally to bicycle-locks, and more particularly to a lock carried by the machine and forming a component part thereof.

The object of the invention is to provide a simple form of lock which can be readily connected to any of the well-known construction of bicycle-frames, either for a man's or lady's wheel; and another object is to provide a bicycle-lock which will hold the front wheel locked in either a straight or cross position.

Another object of the invention is to provide a bicycle-lock which, though exceedingly simple in construction, cannot be easily picked, and is therefore a safe means for preventing the bicycle from being stolen.

Another object of the invention is to provide a lock which shall consist of so few parts so compactly arranged that the lock will take up very little space upon the bicycle-frame and will not be a noticeable feature thereof.

The common method of locking a bicycle is to employ a padlock and chain for locking either the wheel or the sprocket, but this method is objectionable, inasmuch as one is likely to forget the padlock or the key. The object, therefore, of forming my lock as a component part of the bicycle is to avoid this objection and always have the lock upon the bicycle.

With these various objects in view my invention consists in the peculiar construction of the various parts and in their novel combination or arrangement, all of which will be fully described, and pointed out in the claims.

In the drawings forming a part of this specification, Figure 1 is a view showing a bicycle provided with my improved lock, said lock being shown upon the lower incline member of the frame. Fig. 2 is a section on the line 2 2 of Fig. 1. Fig. 3 is a vertical longitudinal section showing the lock arranged upon the upper horizontal bar of the frame. Fig. 4 is a sectional view on the line 4 4 of Fig. 3. Fig. 5 is a detail view of the locking-bolt.

In Fig. 1 I have shown my improved lock as applied to the lower or incline bar of the frame, while in Fig. 2 I have shown said lock applied to the upper or horizontal bar of the frame, it being understood that the construction and operation of the lock are exactly the same in both instances, and the description of one lock will suffice for both.

The tubular portion of the frame A and the steering-head B, turning therein, are of the same or usual construction employed in safety-bicycles. The lock C, which is attached to the member of the frame, consists, essentially, of a case and a bolt working therein, said bolt being adapted to be projected through an opening D in the tubular portion of the frame and into a notch or recess E, provided in the steering-head of the bicycle. By this operation it will be seen that the steering-head will be locked against movement, thereby preventing any one from riding the bicycle, and I prefer to provide a series of such notches or recesses E, so that the front wheel of the bicycle can be locked in a stright, cross, or intermediate position, as desired, as it is sometimes inconvenient to turn the front wheel to lock the same.

The lock-case is preferably composed of the upper and lower sections $C'$ and $C^2$, the lower section having upwardly-extending sides $c$, between which the upper section fits, said sections being bolted together or connected in any suitable manner. A rectangular-shaped recess $C^3$ is produced in the bottom of the lock-case, and extending across said recess is a guide-pin G, upon which the barrel of the key H is adapted to fit, and beneath said pin G the bottom of the recess is depressed, as shown at $G'$, to permit the movement of the bit $H'$ of the key, said bit being of a width to snugly fit in the recess $G'$ and operate the sliding bolt I, which fits in the recess $C^3$ in the bottom of the case, and also extends upward into a recess $C^4$, formed in the under side of the bottom of case.

The bolt I has a forwardly-projecting portion $i$, which rests entirely within the recess $C^4$, and it also has a rearwardly-extending portion $i'$, which rests entirely within the recess $C^3$. The intermediate portion of said bolt rests in both the recesses $C^3$ and $C^4$, as most clearly shown, and about midway its length such bolt is cut out, as shown at K, and provided with the wards $k$ to guide the bit of the key, and adjacent to said cut-out portion the sides of the bolt are recessed or cut away, as shown at $k^2$, to permit the movement of the key. In the upper portion of the bolt recesses L L are produced upon opposite sides, and located in said recesses are the spring-rods M M, said rod being bent upon itself at $m$ and bent outwardly at $m'$, said end $m'$ projecting laterally from the side of the bolt.

The spring-rods M extend across the central opening of the bolt and are adapted to be engaged by the bit of the key, so that when said key is turned to move the bolt longitudinally it first engages the spring-rods, raising the same, which action raises the ends $m'$, so that said ends clear stop-pins $m^2$, said pins being located in the bottom of the lock-case upon opposite sides of the recess $C^3$ and near the opposite ends, the purpose of said pins in connection with the spring-rods being to hold the bolt in either a locked or unlocked position and prevent any accidental movement or displacement of the said bolt, and it will be observed that the top of the lock-case is provided with recesses $n$ to permit the movement of the ends $m'$ as they are raised over and across the pins $m^2$.

The steering-head is preferably provided with some particular mark or marks, and the tubular portion of the frame has a corresponding mark, so that when said marks are brought into coincidence the aperture or depression in the steering-head is directly opposite the end of the bolt, so that said bolt can be projected therein, and when it is desired to lock the steering-head said marks are brought into coincidence, the key inserted and turned forwardly, thus locking the head against movement, and inasmuch as the spring-rods engage the stop-pins it will be seen that it is impossible to jar or accidentally dislocate the said bolt from its locked position.

Whenever it is desired to unlock the steering-head, the key is inserted and turned backward, thus lifting the spring-rods upward clear of the stop-pins, and the continued movement of said key reverses the position of the bolt and spring-rods, thereby holding the bolt in an unlocked position and preventing the same being accidentally projected into engagement while the bicycle is in use.

It will thus be seen that I provide an exceedingly cheap and simple form of bicycle-lock, one which can be applied to either the upper or lower member of the frame, and one which can be applied to any of the bicycles now in use, the only alterations to the ordinary bicycle being to cut an opening in the tubular portion of the frame and one or more depressions in the steering-head. It will also be seen that the lock is composed of very few parts, compactly assembled, so that there is little or no danger of the parts becoming deranged, and, furthermore, the complete lock is small and neat in appearance and will not form a noticeable portion on the bicycle.

By means of the spring-bars and locking-pins all possible danger of accident is avoided, and, furthermore, by the construction of these rods and the peculiar manner of combining them with the bolt it is clear that it is almost impossible for them to become displaced or inoperative.

Having thus described my invention, what I claim as new, and desire to secure by Letters Patent, is—

1. In a bicycle-lock, a case composed of the upper and lower sections, said lower section having a longitudinal recess with the depression in the bottom—the guide-pin extending across said recess, the key adapted to fit upon said guide-pin, the longitudinal movable bolt cut away at the center to receive the pin, the wards arranged upon said bolt, the member-section having a longitudinal recess and supplemental recesses at the side of the main recess, the stop-pins and the rods having laterally-projecting ends, all arranged substantially as shown and described.

2. In a bicycle-lock, the combination of the case formed in two sections, and recessed as described, the guide-pin and key, the locking-bolt shaped as described, the spring-rods secured to said bolt and bent upon themselves, and having laterally-projecting ends, and the lock-pins arranged in the locked sections of the case, substantially as shown and described.

ABRAHAM L. RUFF.

Witnesses:
JAMES LEWIS,
EDWARD WEIMER.